United States Patent

Foreman

[11] Patent Number: 6,136,202
[45] Date of Patent: Oct. 24, 2000

[54] FORCED FLUID INDUCED BACKWASH

[76] Inventor: Michael R. Foreman, 2535 Winfred Rd., Maurice, La. 70555

[21] Appl. No.: 09/152,767

[22] Filed: Sep. 14, 1998

[51] Int. Cl.[7] .............................. B01D 37/04; B01D 33/50
[52] U.S. Cl. ......................... 210/741; 210/780; 210/784; 210/791; 210/798; 210/107; 210/108; 210/392; 210/402; 210/411
[58] Field of Search ...................................... 210/780, 791, 210/798, 107–108, 327, 330, 331, 333.1, 345, 393, 406, 411, 741, 784, 392, 402

[56] References Cited

U.S. PATENT DOCUMENTS

| | | | |
|---|---|---|---|
| 5,330,645 | 7/1994 | Geldmacher | 210/327 |
| 5,494,591 | 2/1996 | Stamm et al. | 210/798 |
| 5,628,916 | 5/1997 | Stevens et al. | 210/798 |
| 5,632,903 | 5/1997 | Caracciolo, Jr. | 210/415 |
| 5,855,799 | 1/1999 | Herrmann | 210/780 |

*Primary Examiner*—Robert J. Popovics
*Attorney, Agent, or Firm*—Trop, Pruner, & Hu, P.C.

[57] ABSTRACT

A system for filtering fluids uses the pressure differential across a filter element between an internal filter volume and an external filter volume to control the rate of fluid flow through the filter element. The internal filter volume communicates with a backwash volume contained in the external filter volume. The backwash volume may be movable relative to the filter element to clean accumulated filtrate from the filter element through backwashing. By increasing the pressure in the internal filter volume, the rate of backwashing can be increased while the rate of fluid flow into the internal filter volume is decreased. Particularly when the filter element becomes clogged, damage to a filter caused by an excessive pressure differential across the filter element may be decreased.

18 Claims, 2 Drawing Sheets

6,136,202

FORCED FLUID INDUCED BACKWASH

BACKGROUND

This invention relates generally to filtering fluids, and particularly to filters which include self-cleaning elements.

Filters receive dirty fluid to be filtered in an external filter volume and pass the fluid through the filter. The cleaned fluid is received in an internal filter volume. The filter may be operated until the filter element becomes too dirty. Then, it is necessary to break the machine down, remove the filter element, and clean or replace the filter element. Thus, the amount of fluid that may be filtered is a function not only of the flow rate through the filter, but also of the downtime that results from filter replacement.

Greater time between filter element replacements may be possible with filters with self-cleaning elements. One way of providing a self-cleaning filter is to provide a backwash volume generally located in the external filter volume which cleans the dirty fluid side of the filter element. It is known to clean the filter element by spraying liquid on the dirty side of the filter element and by causing a backwash through the filter element.

While many important advances have been made in filter design, there is a continuing need for a filter which is capable of filtering fluids with a high concentration of solid material to be removed. Also there is a need for filters that can remove particles from a fluid of smaller particle size. There is also a continuing need for such filters which increase the mean time between filter element replacement. Obviously, the longer that the filter can operate without stoppage the greater the effective amount of fluid which may be filtered.

SUMMARY

In accordance with one embodiment, a method of filtering includes passing fluid to be cleaned from an external filter volume through a filter element into an internal filter volume. The fluid from the internal filter volume is then passed back through the filter element into a backwash volume. The internal filter volume is pressurized to a pressure less than the pressure in the external filter volume and greater than the pressure in the backwash volume to increase the rate of flow of fluid from the internal filter volume through the filter element into the backwash volume.

DETAILED DESCRIPTION

Figure 2:
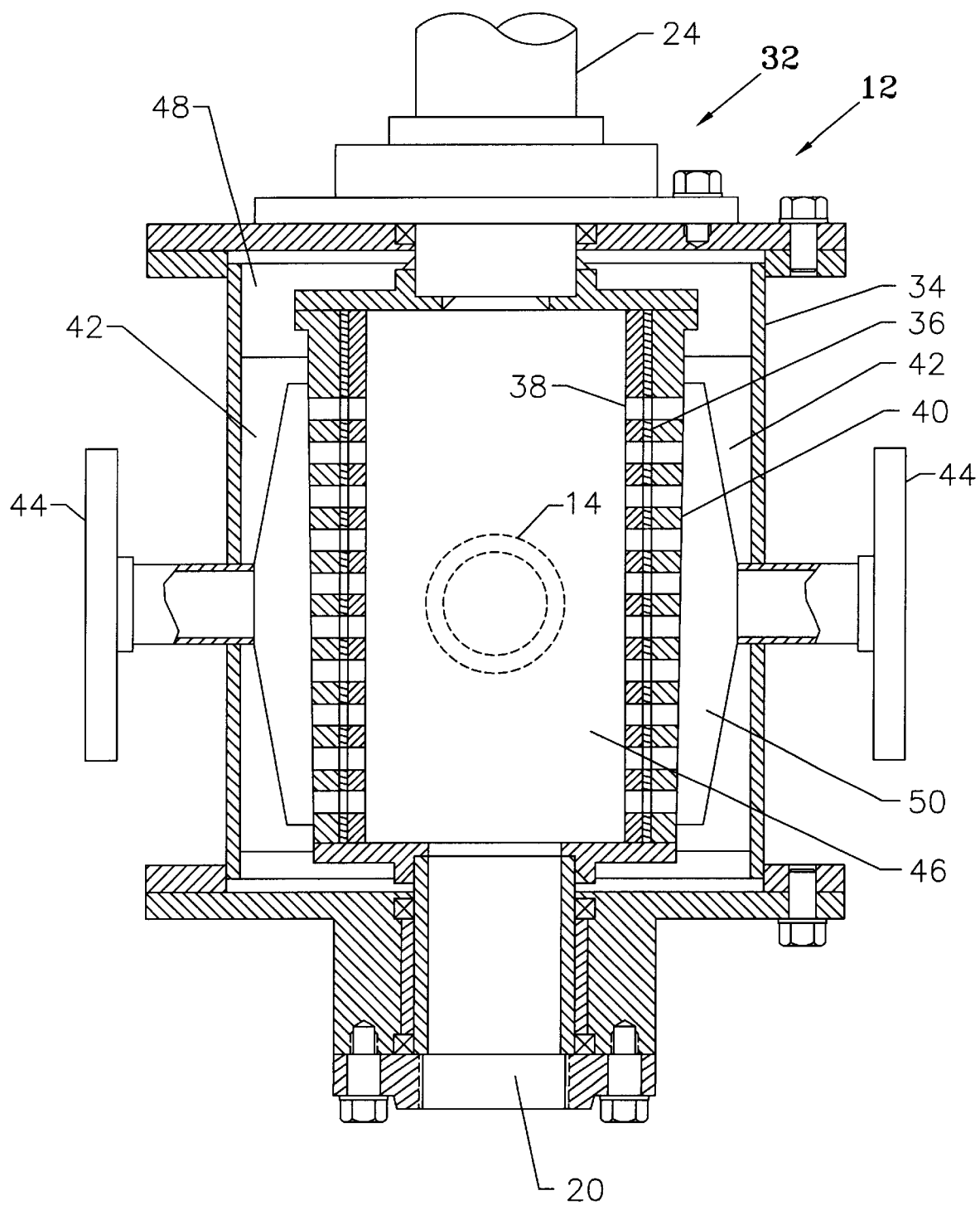
FIG. 2 is a cross-sectional view taken generally along the line 2—2 in FIG. 1.

A filter 12, shown in FIG. 2, includes a housing 34 which defines an external filter volume 48 and which supports a filter element 36. The filter element 36 is illustrated as cylindrical in shape but any of a variety of known filter shapes may be utilized to implement embodiments of the present invention. Thus, the filter element 36 could be rectangular, disk shaped, or any other desired shape. The illustrated filter element 36 rotates in the direction of the arrow A around a sealed shaft 24 which is driven by a drive motor 22.

A pair of backwash volumes are defined by housings 42 which are maintained in sealing abutment with the exterior surface of the filter element 36. Thus, the backwash housings 42 are positioned in the external filter volume 48. A number of different embodiments for the backwash housing 42 may be utilized. In the illustrated embodiment, a pair of backwash housings 42 extend along the length of the filter element 36 on two opposed sides. As the filter element 36 rotates, the entire surface of the filter element may eventually be exposed to the open faces of both backwash housings 42. The backwash housings 42 communicate through tubes 44 (FIG. 2) with the valves 16 and 18 shown in FIG. 1.

Figure 1:
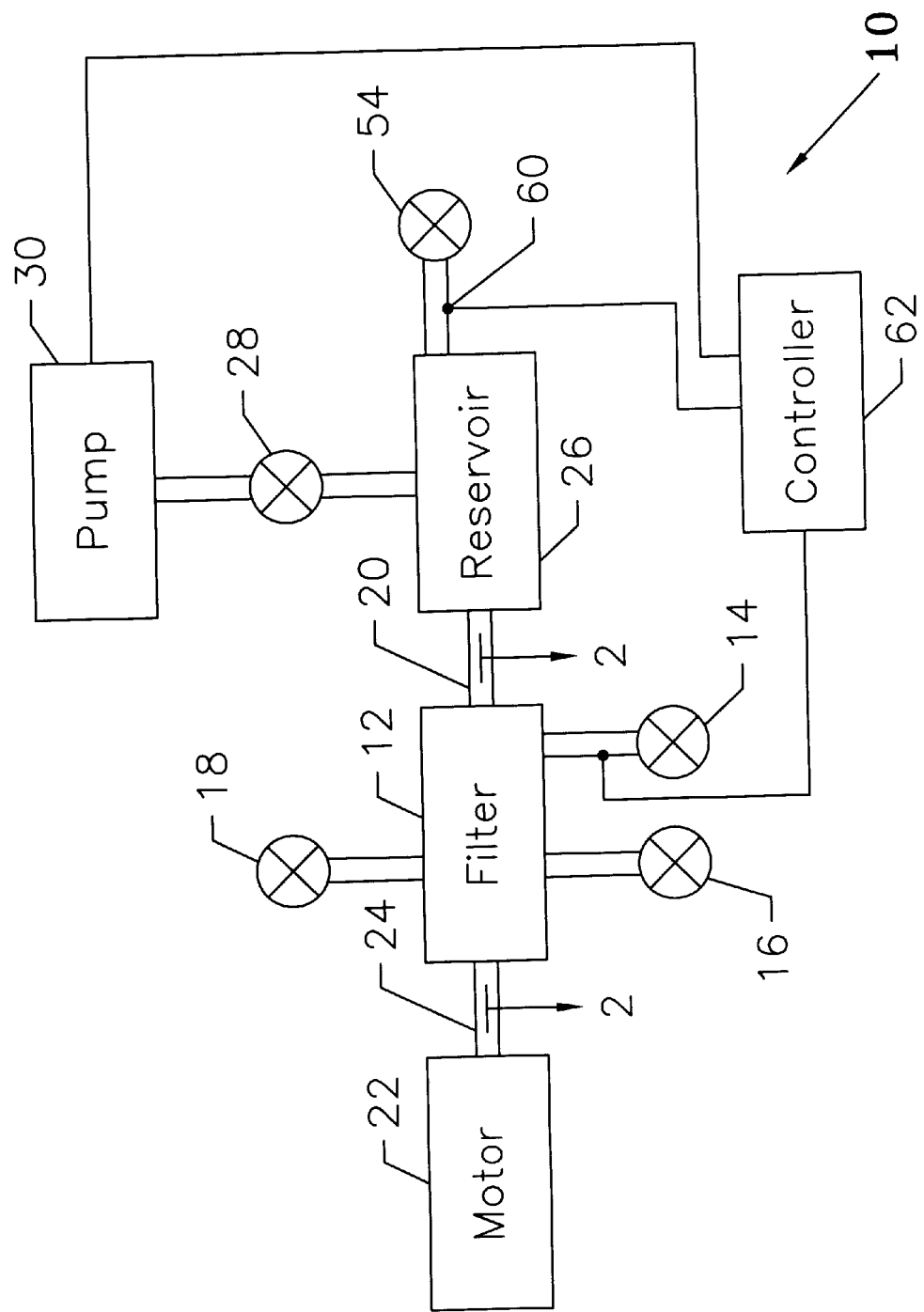
FIG. 1 is a schematic depiction of one embodiment according to the present invention.

The interior of the filter 12 communicates through the sealed rotating pipe 20 with a clean fluid reservoir 26, as shown in FIG. 1. The reservoir 26 is in communication, through the valve 28, with a source of fluid pressure 30 which may, for example, be an air pump. Liquid may be removed from the reservoir 26 through the valve 54 as desired.

Fluid may be added to the external filter volume 48 through the housing 34 by way of the valved inlet 14. The pressure in the external filter volume 48 may be controlled by the rate of fluid flow through the inlet 18 using conventional valves and control systems.

Referring to FIG. 2, the dirty fluid in the external filter volume 48 flows through the filter 36 to the internal filter volume 46 as a result of the pressure differential across the filter element 36. The pressure differential must be greater than the pressure drop caused by the filter element to induce adequate flow of filtered liquid into the internal filter volume 46. Once in the internal filter volume 46, the fluid may enter the pipe 20 and flow into the clean fluid reservoir 26 where it may be stored. Clean fluid in the internal filter volume 46 can be caused to pass back through the filter element 36 into the backwash housings 42.

Thus, as the filter element 36 rotates, successive areas of the filter element 36 are exposed to a backwash flow which removes the collected filtrate from the filter element. The removed filtrate flows outwardly from the housing 34 through valves 16 and 18. The valves 16 and 18 may be operated to control the pressure in the housings 42. The housings 42 may substantially sealingly engage the external filter support plate 40. An internal support plate 38 may support the filter 36 internally. The tapered shape of the external support plate 40, together with gravity, seals the backwash volumes 50.

The rate that backwash fluid exits through the valves 16 and 18 is a function of the pressure in the external filter volume 48, the internal filter volume 46 and the backwash volumes 50. Of course in order to induce fluid flow, the pressure must progressively drop from the volume 48 to the volume 46 to the volume 50.

The inventor of the present invention has appreciated that if the rate of filtrate accumulation is excessive, the pressure drop across the filter element 36 between the volumes 48 and 46 may become excessive, resulting in potential damage to the filter element 36. The higher the pressure forcing the fluid to pass through the filter element, the greater the likelihood of damage to the filter element 36.

These problems may be substantially decreased by inducing a pressure in the internal volume 46. This pressure may be applied to the clean fluid reservoir 26 by the pump 30. For example, a fluid which is less dense than the fluid being filtered may enter the reservoir 26, which is in fluid communication with the internal filter volume 46. For example, air may be pumped into the reservoir 26 to raise the pressure inside the internal filter volume 46.

As a result, the rate of flow from the external filter volume 48 to the internal filter volume 46 may be decreased. This may advantageously allow the cleaning operation, implemented by the backwash housings 42, to catch up with the rate of deposition of filtrate on the filter element. This may also prevent large pressure excursions in the external filter volume 48. Moreover, by increasing the pressure inside the internal filter volume 46, the rate of flow outwardly from the internal filter volume 46 to the backwash volumes 50 may be increased.

The process of pressurizing material filter volume may be a continuous one. Alternatively, when the pressure differential across the filter element 36 between the volumes 48 and 46 becomes excessive, the pressure in the internal filter volume 46 can be increased to be slightly below the pressure in the external filter volume 48. The increased internal filter volume pressure increases the rate of backwashing, slows down the rate of filtration of dirty fluid, and avoids an excessive pressure excursion in the exterior filter volume 48.

For this purpose, pressure sensors 60 may be placed in communication with the internal and external filter volumes as shown in FIG. 1. When the difference in pressures exceeds a pre-set limit, a controller 62 may activate the pump 30. After a time interval the pump 30 may be turned off. Similarly, the controller may turn off the pump if the pressure in the internal filter volume exceeds the pressure in the external filter volume.

At the same time, the pressure in the backwash volumes 50 may be modulated using the valves 16 and 18. If faster backwashing is desired, the valves 16 and 18 may be opened, allowing more fluid to flow through the volumes 50 and decreasing their internal pressure.

Thus, the filtration process may be rigorously controlled to optimize both the filtration and the backwashing operation with the particular conditions encountered with a given fluid being filtered. By controlling the pressurization of the internal filter volume, the filter element may be protected from damage, and the backwashing operation may be optimized. This may be achieved without any kind of complicated mechanism or elaborate sealing systems. Therefore, in some embodiments, the present invention may enable filters to be operated for a longer time before a filter element change, damage to filters may be lessened and efficiency of the filtering operation may be improved.

While the present invention has been described with respect to a limited number of embodiments, those skilled in the art will appreciate numerous modifications and variations therefrom. It is intended that the appended claims cover all such modifications and variations as fall within the true spirit and scope of the present invention.

What is claimed is:

1. A method of filtering comprising:
   passing fluid to be filtered from an external filter volume through a filter element into an internal filter volume;
   passing fluid from said internal filter volume back through said filter element into a backwash volume; and
   pressurizing said internal filter volume to a pressure less than the pressure in said external filter volume and greater than the pressure in said backwash volume using a pressure source independent of the external filter volume increase the rate of flow of fluid from said internal filter volume through the filter element into said backwash volume.

2. The method of claim 1 including moving said filter element relative to said backwash volume.

3. The method of claim 1 including pressurizing said internal filter volume using a fluid which is less dense than the fluid being filtered.

4. The method of claim 3 including using air to pressurize said internal filter volume.

5. The method of claim 1 including controlling the pressure in said backwash volume.

6. The method of claim 5 including controlling the pressure in said external filter volume.

7. The method of claim 1 including continuously pressurizing said internal filter volume.

8. The method of claim 1 including pressurizing said internal filter volume when the pressure difference between said external filter volume and said internal filter volume exceeds a preset limit.

9. The method of claim 1 including pressurizing said internal filter volume to a level sufficient to prevent damage to said filter element from the pressure differential across said filter.

10. A filter comprising:
    a filter element;
    an external filter volume;
    an internal filter volume communicating with said external filter volume through said filter element;
    a backwash volume in said external filter volume, said backwash volume communicating with said internal filter volume through said filter element, said filter element being moveable relative to said backwash volume; and
    a fluid pressure source independent of said external filter volume, said source connected to said internal filter volume, so as to allow the pressure of said internal filter volume to be increased.

11. The filter of claim 10 wherein said filter element is contained entirely within said external filter volume.

12. The filter of claim 10 including an external reservoir for containing fluid which has passed through said filter element.

13. The filter of claim 12 wherein said fluid pressure source is coupled to said reservoir.

14. The filter of claim 10 wherein said fluid pressure source includes an air pump.

15. The filter of claim 10 including a device to control the pressure in said backwash volume.

16. The filter of claim 10 including a device to control the pressure in said external filter volume.

17. The filter of claim 10 including a sensor to detect the pressure difference between said external filter volume and said internal filter volume, said sensor adapted to communicate with said pressure source.

18. The filter of claim 17 wherein said sensor is operable to operate said fluid pressure source when the pressure differential exceeds a predetermined limit.

* * * * *